United States Patent
Garagnani et al.

(10) Patent No.: US 9,322,382 B2
(45) Date of Patent: Apr. 26, 2016

(54) METHOD FOR DETECTING DETONATION PHENOMENA IN AN INTERNAL COMBUSTION ENGINE

(71) Applicant: MAGNETI MARELLI S.p.A., Corbetta (IT)

(72) Inventors: Nicola Garagnani, Crespellano (IT); Riccardo Lanzoni, Imola (IT); Filippo Cavanna, Bologna (IT)

(73) Assignee: MAGNETI MARELLI S.P.A., Corbetta (IT)

( * ) Notice: Subject to any disclaimer, the term of this patent is extended or adjusted under 35 U.S.C. 154(b) by 210 days.

(21) Appl. No.: 14/276,385

(22) Filed: May 13, 2014

(65) Prior Publication Data

US 2014/0338433 A1  Nov. 20, 2014

(30) Foreign Application Priority Data

May 14, 2013  (IT) .............................. BO2013A0224

(51) Int. Cl.
*G01M 15/11*  (2006.01)
*F02P 17/12*  (2006.01)
(Continued)

(52) U.S. Cl.
CPC .............. *F02P 17/12* (2013.01); *F02D 35/027* (2013.01); *F02D 41/008* (2013.01); *F02P 5/1522* (2013.01); *G01L 23/226* (2013.01); *G01L 23/227* (2013.01); *G01M 15/042* (2013.01); *G01M 15/11* (2013.01); *Y02T 10/46* (2013.01)

(58) Field of Classification Search
CPC ... G01L 23/226; G01L 23/227; G01M 15/11; F02D 35/027
USPC ......... 73/35.01, 35.03, 35.06, 114.02, 114.08
See application file for complete search history.

(56) References Cited

U.S. PATENT DOCUMENTS

| 5,386,722 A | 2/1995 | Meyer et al. |
|---|---|---|
| 6,234,146 B1 | 5/2001 | Tanaya et al. |

(Continued)

OTHER PUBLICATIONS

Mar. 31, 2014 Italian Search Report for IT BO Feb. 24, 2013.

*Primary Examiner* — Eric S McCall
(74) *Attorney, Agent, or Firm* — Howard & Howard Attorneys PLLC

(57) ABSTRACT

A method for detecting the development of detonation phenomena in an internal combustion engine (1) which includes determining the variance ($\sigma_i$) of each combustion taken into account for a given cylinder (2) and in a given engine point as a function of the comparison between the detonation energy ($\mu_i$) of each combustion taken into account and the self-learnt mean detonation energy ($\mu_{i\_m}$) for the given cylinder (2) and in the given engine point; calculating the maximum variance ($\sigma_{i\_max}$) for a given cylinder (2) and in a given engine point with a reduction of the spark advance actuated in the given cylinder (2); and determining the development of detonation phenomena for each combustion taken into account as a function of the comparison between the maximum variance ($\sigma_{i\_max}$) and the variance ($\sigma_i$) of each combustion taken into account for a given cylinder (2) and in a given engine point.

12 Claims, 3 Drawing Sheets

(51) Int. Cl.
*F02D 41/00* (2006.01)
*F02P 5/152* (2006.01)
*F02D 35/02* (2006.01)
*G01L 23/22* (2006.01)
*G01M 15/04* (2006.01)

(56) References Cited

U.S. PATENT DOCUMENTS 7,747,380 B2 * 6/2010 Chauvin et al. ............... 701/111
2007/0000306 A1 * 1/2007 Danet et al. .................. 73/35.04

* cited by examiner

METHOD FOR DETECTING DETONATION PHENOMENA IN AN INTERNAL COMBUSTION ENGINE

CROSS-REFERENCE TO RELATED APPLICATION

This application is based upon and claims priority to Italian Patent Application No. BO2013A000224 filed on May 14, 2013.

BACKGROUND OF THE INVENTION

1. Field of Invention

The present invention relates generally to internal combustion engines and, more specifically, to a method for detecting detonation phenomena in an internal combustion engine.

2. Description of Related Art

Spark ignited internal combustion engines typically include a plurality of cylinders, each of which has a piston that cyclically slides within the cylinder. Each cylinder also includes a spark plug that is cyclically operated by an electronic control unit to generate a spark between its electrodes, and thus determine the ignition of the compressed gases within the cylinder itself. The control unit includes a memory, in which a series of maps which provide the operating values of the spark plugs as a function of the current engine point; in particular, the maps provide the value of the spark advance for each spark plug (the value of the angular interval existing between the ignition; the generation of the spark between the electrodes of the spark plug) and the top dead center or TDC of the piston. If the value of the spark advance is zero, then the ignition (the generation of the spark between the electrodes of the spark plug) occurs exactly at the top dead center or TDC of the piston.

The values of the spark advance stored in the maps contained in the control unit are determined during the engine set up phase to attempt to ensure a good combustion under all possible conditions of operation and obtain a good thermal efficiency of the engine while safeguarding the integrity of the engine itself (avoiding the presence of excessive detonation phenomena in the cylinders). Detonation is an explosive type of combustion of the air-fuel mixture, which occurs before the mixture is reached by the flame front generated by the spark plug. A series of pressure waves are created upon the detonation, which cross the combustion chamber and violently impact against the metal walls. Detonation occurs when given critical temperature and pressure values are exceeded inside the chamber (which may vary even considerably from engine to engine) and which, when occurring at medium-to-low rpm, often cause a typical (and clearly perceivable) metallic noise known as "knocking" or "pinging".

Detonation normally occurs when spark advance is excessive, when a fuel with an excessively low octane rating is used (the antiknock potential of a fuel is indeed indicated by its octane rating) or, for supercharged/turbocharged engines, when the boost pressure is too high. The combustion trend is influenced by many factors (the most important are the fuel features, the engine head temperature, and the spark plug decay), the effect of which is significantly difficult to predict with accuracy. Thus, the absence of excessive detonation is detected and, in the case of excessive detonation in a cylinder, the control unit reduces the value of the spark advance for the cylinder so as to eliminate the detonation in the cylinder itself (so that the maximum pressure reached in the cylinder is reduced and occurs later with respect to TDC, making the detonation event "less likely"). However, in terms of combustion efficiency, reducing the spark advance of a cylinder corresponds to a loss of thermodynamic efficiency; the air mass for the cylinder (and, thus, the injected gasoline mass) is maintained constant. However, by reducing the spark advance, the combustion efficiency (the fraction of chemical energy which is converted into mechanical energy) is reduced, resulting in negative repercussions on fuel consumption and the generation of polluting substances (emissions).

Thus, there remains a need in the art for a strategy for effectively recognizing the development of excessive detonation.

SUMMARY OF THE INVENTION

The present invention overcomes the disadvantages in the related art in a method for detecting the development of detonation phenomena in an internal combustion engine provided with a number of cylinders, a control unit, and a number of detonation sensors connected to the control unit. The detonation sensors include at least one of an accelerometer and a voltage gauge connected and arranged in series to the electric circuit of a spark plug to measure the voltage at the terminals of the electrodes of the spark plug during at least one of combustion and a pressure gauge which measures the maximum amplitude pressure oscillation of the intensity of the pressure waves generated in the cylinders during combustion. The method includes the steps of: acquiring the signal coming from said number of detonation sensors connected to the control unit; processing the signal coming from said number of detonation sensors connected to the control unit so as to obtain the detonation energy of each combustion taken into account for a given cylinder and in a given engine point; filtering the detonation energy of each combustion taken into account for a given cylinder and in a given engine point; calculating the mean detonation energy for a given cylinder and in a given engine point with the filtered value of the detonation energy of each combustion taken into account for a given cylinder and in a given engine point; comparing the detonation energy of each combustion taken into account for a given cylinder and in a given engine point with the mean detonation energy for a given cylinder and in a given engine point; determining the variance of each combustion taken into account for a given cylinder and in a given engine point as a function of the comparison between the detonation energy of each combustion taken into account for a given cylinder and in a given engine point and the mean detonation energy for a given cylinder and in a given engine point; calculating the maximum variance for a given cylinder and in a given engine point with a reduction of the spark advance actuated in the given cylinder; comparing the maximum variance for a given cylinder and in a given engine point with the variance of each combustion taken into account for a given cylinder and in a given engine point; and determining the development of detonation phenomena for each combustion taken into account for a given cylinder and in a given engine point as a function of the comparison between the maximum variance for a given cylinder and in a given engine point and the variance of each combustion taken into account for a given cylinder and in a given engine point.

In this way, the present invention provides a method for detecting detonation phenomena in an internal combustion engine, the method being free from the above-described drawbacks know in the art and, in particular, being easy and cost-effective to implement. Further, the present invention provides an electronic control unit suited to recognize detonation phenomena in an internal combustion engine that is free from the drawbacks of the prior art.

Other objects, features and advantages of the present invention will be readily appreciated as the same becomes better understood after reading the subsequent description taken in connection with the accompanying drawings.

BRIEF DESCRIPTION OF THE DRAWINGS

The present invention will now be described with reference to the accompanying drawings, which show a non-limitative embodiment thereof, in which.

DETAILED DESCRIPTION OF THE INVENTION

Figure 1:
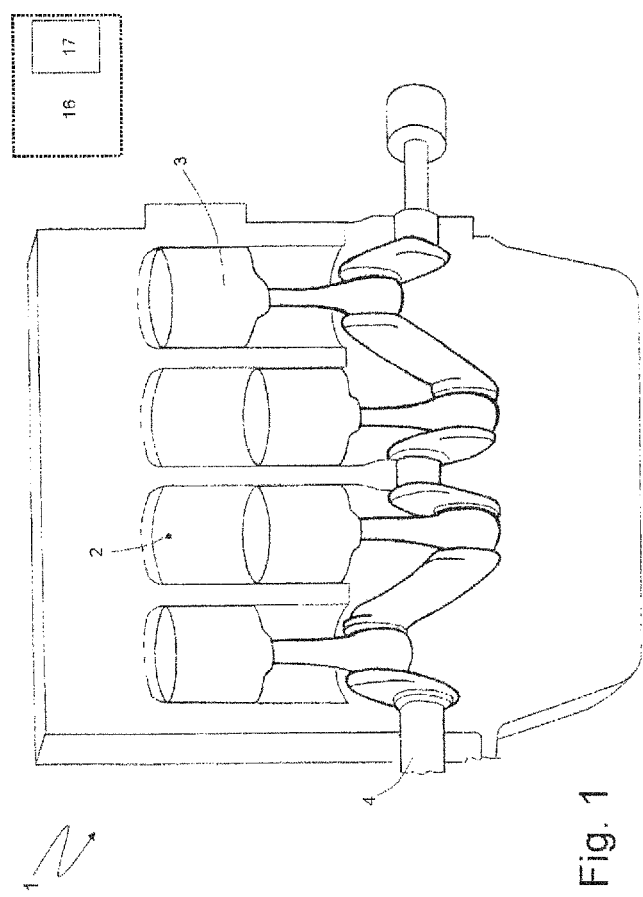
FIG. 1 is a diagrammatic view of an internal combustion engine provided with a control unit that implements the method for detecting detonation phenomena of the present invention.

Referring now to the figures, where like numerals are used to designate like structure, reference numeral 1 indicates, as a whole, a spark ignited internal combustion engine having four cylinders 2 in an inline arrangement. Each cylinder 2 includes a respective piston 3 which is mechanically connected by a connecting rod to a crank shaft 4 to transmit the force generated by the combustion in cylinder 2 to the crank shaft 4 itself.

Figure 2:
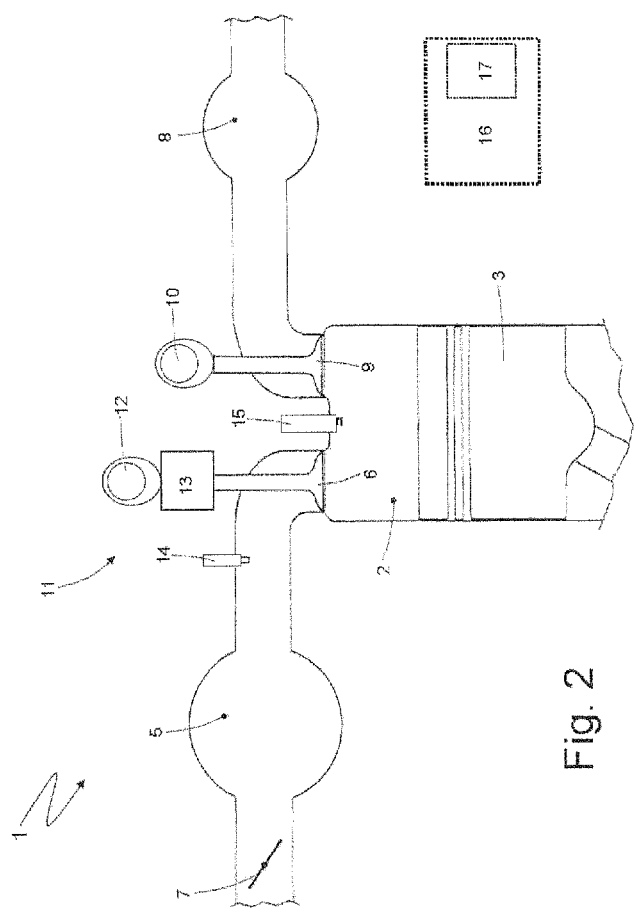
FIG. 2 is a diagrammatic view of a cylinder of the internal combustion engine in FIG. 1.

As shown in FIG. 2, the internal combustion engine 1 includes an intake manifold 5, which is connected to each cylinder 2 by two intake valves 6 (of which only one is shown in FIG. 2) and receives fresh air (air from the outside environment) though a butterfly valve 7 (also referred to as a throttle body), which is moveable between a closing position and a maximum opening position. The internal combustion engine 1 also includes an exhaust manifold 8, which is connected to each cylinder 2 by two exhaust valves 9 (only one of which is shown in FIG. 2) which flows into an exhaust pipe to expel the gases produced in the combustion into the atmosphere.

The position of each exhaust valve 9 is directly controlled by a camshaft 10 which receives motion from the crank shaft 4. The position of the intake valves 6 is controlled by a valve opening controlling device 11 which controls the intake valves 6 by managing the opening angle and lift so as to control the delivered torque by the intake valves 6. The valve opening control device 11 uses a traditional camshaft 12 which receives motion from the crank shaft 4 and for each intake valve 6 an electrically controlled hydraulic actuator 13 (controlled by a solenoid valve), interposed between a stem of the intake valve 6 and the camshaft 12. By appropriately controlling each hydraulic actuator 13, it is possible to adjust the motion transmitted by the camshaft 12 to the intake valve stem 6, and it is thus possible to adjust the actual lift of the intake valve 6. Thus, the action of the control device 11 allows the lift of each intake valve 6 to vary independently from the other intake valves 6, for each cylinder 2, and engine cycle.

A corresponding injector 14 is provided for each cylinder 2; in the embodiment shown in FIG. 2, the injector is of the indirect type and thus each injector 14 is arranged upstream of a cylinder 2 in an intake pipe which connects the intake manifold 5 to cylinder 2. Alternatively, the injector could be of the direct type and, thus, each injector 14 could be partially arranged within the cylinder 2. Furthermore, each cylinder 2 includes a spark plug 15 arranged through the top of cylinder 2 in central position between the intake valves 5 and the exhaust valves 9, the spark plug 15 being cyclically activated to determine the ignition of the compressed gases within cylinder 2 at the end of each compression stroke.

The engine 1 also includes a control unit 16, which governs the operation of the internal combustion engine 1 and also controls the spark plugs 15 to determine the ignition of the compressed gases in each cylinder 2. The control unit 16 includes a memory 17 in which a series of maps, which provide the operating values of the spark plugs 15 as a function of the current engine point are stored. In particular, the maps stored in the memory 17 provide a standard spark advance for each spark plug 15 (for each cylinder 2).

The method for controlling the detonation in the internal combustion engine 1 which is implemented by the control unit 16 is described below.

The method for detonation control method which is implemented by the control unit 16 includes providing an indication of the intensity of the detonation phenomenon in the internal combustion engine 1 by appropriately processing a signal coming from one or more detonation sensors connected to the control unit 16. For example, a detonation sensor arranged so as to determine the ignition of the compressed gases within each cylinder 2 is provided for each spark plug 15. In one embodiment, each detonation sensor includes a voltage gauge that is connected and arranged in series to the electric circuit of the spark plug 15, so as to measure the voltage at the terminals of the electrodes of the spark plug 15 during combustion. In one embodiment, each detonation sensor includes a pressure gauge that measures the maximum amplitude pressure oscillation (MAPO) of the intensity of the pressure waves generated in the cylinders 2 of the internal combustion engine 1 during combustion. Further, the detonation sensors may include an accelerometer connected to a motor housing of the internal combustion engine 1.

Figure 3:
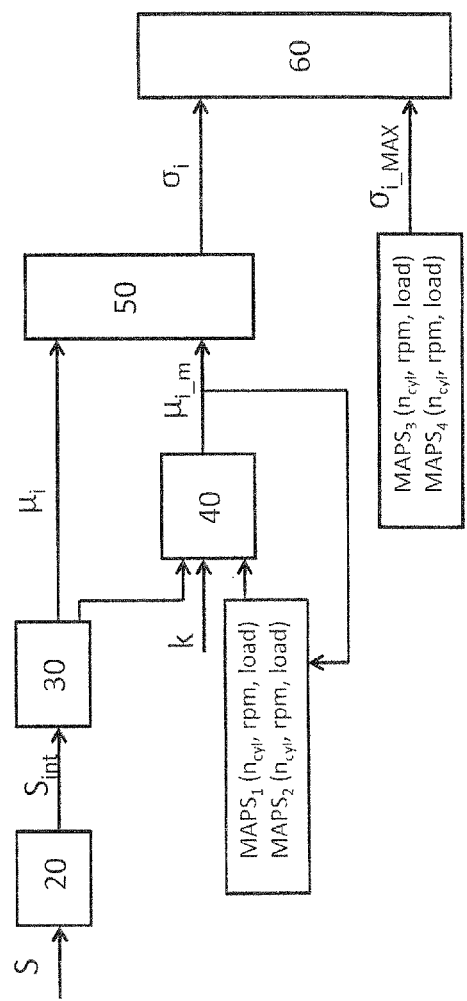
FIG. 3 is a block chart of the method for detecting detonation phenomena of the present invention.

FIG. 3 diagrammatically shows the detonation control method implemented by the control unit 16, in which block 20 receives in input the signal (or, signals) coming from one or more detonation sensors connected to the control unit 16, and each including a respective voltage gauge. The block 20 processes the signal (or, signals) coming from the one or more detonation sensors connected to the control unit 16, and subsequently outputs the processed signal to the following block 30. In particular, the signal (or, signals) coming from the one or more detonation sensors connected to the control unit 16 is (or, are) sampled at a constant frequency determined during a preliminary adjustment and set up phase (for example, a frequency equal to 50 kHz). In one embodiment, when at least two detonation sensors are provided, the sampling frequency assumes the same value for all the detonation sensors. Once the signal coming from the one or more detonation sensors connected to the control unit 16 has been sampled, an alternating signal which is then rectified is obtained. The rectified signal is further processed to be transmitted to block 30.

In one embodiment, the derivative is calculated from the rectified signal and thus transmitted to block 30. The derivative action of the rectified signal has the drawback of making the detonation control method implemented by the control unit 16 excessively sensitive to variations of the signal itself.

In another embodiment, the integral is calculated from the rectified signal and thus transmitted to block 30. The integral action on the rectified signal allows the detonation control method implemented by the control unit 16 to store the passed values of the signal. As shown in FIG. 3, the integrated signal is then transmitted to block 30. The integrated signal transmitted to block 30 represents combustion energy, which depends on cylinder 2 and on the engine point at which the combustion is observed, as the signal comes from a detonation sensor connected to the electric circuit of a respective spark plug 15 to measure the voltage at the terminals of the electrodes of the spark plug 15 itself during combustion in a given engine point of the respective cylinder 2.

It has been empirically found that the detonation energy of each combustion taken into account (for the cylinder 2 taken into account in a given engine point) is variable between a zero value that indicates complete absence of detonation, and a maximum value that indicates a completely detonating combustion. In particular, the detonation energy of each combustion taken into account (for the cylinder 2 taken into account in a given engine point) assumes a log-normal distribution $\chi^2$. Such a log-normal distribution $\chi^2$ may be distorted by a mathematical device (for example, by applying a logarithmic curve) and is transformed into a Gaussian or normal distribution with a mean value $\mu_1$ and a standard deviation $\sigma_1$. Thus, the log-normal distribution $\chi^2$ is simply the probability distribution of an aleatory variable the logarithm of which follows a normal distribution, with mean value $\mu_1$ and a standard deviation $\sigma_1$.

Block 30 is thus prepared to receive in input the log-normal distribution $\chi^2$ of the detonation energy for each combustion taken into account (for the cylinder 2 taken into account in a given engine point) and process it so as to output the normal distribution of the detonation energy for each combustion taken into account (for the cylinder 2 taken into account in a given engine point). The processing of block 30 of the log-normal distribution $\chi^2$ of the detonation energy in each combustion taken into account (for the cylinder 2 taken into account in a given engine point) is calculated because the mean value $\mu_1$ and the standard deviation $\sigma_1$ are independent in the normal distribution although they both depend on the engine point. In particular, the normal distribution of the detonation energy of each combustion taken into account (for the cylinder 2 taken into account in a given engine point) has a mean value $\mu_i$ and a standard deviation $\sigma_i$. The mean value $\mu_i$ is the nominal noise contribution of the combustion taken into account (for the cylinder 2 taken into account in the current engine point). In other words, the mean value $\mu_i$ is the energy (the mean noise) of the combustion taken into account (for the cylinder 2 in the current engine point). The standard deviation $\sigma_i$ is determined instead by the cyclic variability, including incorrect combustion phenomena (misfire, detonation etc.). In other words, the deviation of the value of the i-th combustion from the mean value allows to identify the trend or predisposition to detonate of the combustion taken into account (for the cylinder 2 in the current engine point).

It will be appreciated that correctly determining the mean value $\mu_i$ (the nominal noise contribution of the combustion taken into account (for the cylinder 2 taken into account in the current engine point) and the standard deviation $\sigma_i$ (the trend or predisposition to detonate of the combustion taken into account (for the cylinder 2 taken into account in the current engine point) are at the heart of the method for controlling detonation in the internal combustion engine 1 implemented by the control unit 16.

Block 30 thus provides a representative value of the overall noise (mean nominal noise+/−noise due to specific combustion cycle phenomena which occurred for the cylinder 2 taken into account and in the current engine point, which are impossible to separate beforehand from the mean nominal noise). In other words, block 30 provides the overall combustion energy $\mu_i$ of the i-th combustion taken into account for the cylinder 2 taken into account in the current engine point. The combustion energy $\mu_i$ of the i-th combustion taken into account for the cylinder 2 taken into account in the current engine point block 30 output from block 40 is transmitted and inputted into a block 40 which is suited to determine the average combustion energy $\mu_{i\_m}$ for the cylinder 2 taken into account in the current engine point.

Block 40 is a filter, preferably of the low-pass type. In one embodiment, the filter is a first order filter. Also in this case, it is apparent that a correct determination of the constant k filter in block 40 is a fundamental aspect of the method for controlling the detonation in the internal combustion engine 1 which is implemented by the control unit 16. The constant k filter results from the trade-off between the need of independence of the single i-th combustion taken into account for the cylinder 2 taken into account in the current engine point and the capacity of the filter itself to react to changes of conditions (the capacity of the filter to adapt to variations of the cylinder 2 taken into account and current engine point (in yet other words, the filter must not be excessively "deaf" to variations of the cylinder 2 taken into account and current engine point.

A group of maps $MAPS_1$ are stored in the control unit 16. In one embodiment, the group of maps $MAPS_1$ includes a map $MAPS_1$ for each cylinder 2 of the internal combustion engine 1. In turn, each map $MAPS_1$ for each cylinder 2 of the internal combustion engine 1 includes a variable number of cells as a function of the engine points which may be explored during the running of the internal combustion engine 1. Each map $MAPS_1$ for each cylinder 2 of the internal combustion engine 1 includes a number of cells univocally identified by the number of revolutions per minute (rpm) and the load. The filtered value of the combustion energy $\mu_i$ of the i-th combustion taken into account for the cylinder 2 taken into account in the current engine point output from block 40 is used to update the corresponding cell in the group of maps $MAPS_1$ (the filtered value is used to update the map $MAPS_1$ of the cylinder 2 taken into account in its i-th combustion in the current engine point defined by the number of revolutions per minute (rpm) and the load (load)).

The updating of the cell in the group of maps $MAPS_1$ is obtained by a weighted mean between the value already stored in said cell in the group of maps $MAPS_1$ and the filtered value of the combustion energy $\mu_i$ in the i-th combustion taken into account for the cylinder 2 taken into account in the current engine point output from block 40. The mean combustion energy $\mu_{i\_m}$ for the cylinder 2 taken into account in the current engine point is thus obtained by the weighted mean of the value already stored in the cell in the group of maps $MAPS_1$ and the filtered value of the combustion energy $\mu_i$ in the i-th combustion taken into account and is made so that by updating the cell in the group of maps $\mu_i$ the filtered value of the combustion energy of the i-th combustion taken into account assumes a gradually decreasing value. In other words, the more i-th combustions in the cylinder 2 taken into account in the current engine point from which the combustion energy $\mu_i$ (the nominal noise) was derived, the more relevant will be the contribution of the filtered value of the combustion energy $\mu_i$ of the n-th combustion taken into account and the higher will be the contribution of the value already stored in the cell in the group of maps $MAPS_1$. To that end, a group of maps $MAPS_2$ are also stored in the control unit 16. Advantageously, the structure of the group of maps $MAPS_2$ is identical to the structure of the group of maps $MAPS_1$. Thus, the group of maps $MAPS_2$ may include a map $MAPS_2$ for each cylinder 2 of the internal combustion engine 1 (a respective map $MAPS_1$ of the group of maps $MAPS_1$ is associated to each map $MAPS_2$). Furthermore, in turn, each map $MAPS_2$ for each cylinder 2 of the internal combustion engine 1 includes a variable number of cells as a function of the engine points which may be explored during the running of the internal combustion engine 1. Each map $MAPS_2$ for each cylinder 2 of the internal combustion engine 1 includes a number of cells univocally identified by the number of revolutions per minute (rpm) and the load (load). Also in this case, each cell which identifies an engine point in the maps $MAPS_2$ thus corresponds to a respective cell which identifies the same engine point in the $MAPS_1$. The group of maps $MAPS_2$ includes counters of the number of combustions taken into account during the life of the internal combustion engine 1 for the corresponding cylinder 2 and in a given engine point in the cells. The counters in the cells of the group of maps $MAPS_2$ are initialized in a preliminary adjustment and set up phase of the control unit 16. In one embodiment, the initialization values of the counters in the cells of the group of maps $MAPS_2$ are variable as a function of the cylinder 2 and/or engine point taken into account. Furthermore, a lower saturation value is also determined during a preliminary adjustment and set up phase. The lower saturation value may be variable as a function of the cylinder 2 and/or engine point taken into account.

In operation, when a combustion is observed during the life of the internal combustion engine 1 for a given cylinder 2 and in a given engine point, the corresponding counter of the cell of the group of maps $MAPS_2$ which corresponds to that given cylinder 2 and that given engine point is decreased by one unit. As the number of combustions observed during the life of the internal combustion engine 1 for a given cylinder 2 and in a given engine point (as the counter in the cell of the group of maps $MAPS_2$ which corresponds to that given cylinder 2 and that given engine point decreases), the weight of the value already stored in the cell in the group of maps $MAPS_1$ increases and therefore the weight of the filtered value of the combustion energy $\mu_i$ of the i-th combustion taken into account is reduced. In the weighted mean between the value already stored in the cell in the group of maps $MAPS_1$ and the filtered value of the combustion energy $\mu_i$ of the i-th combustion taken into account, the values of the weights are thus variable during the life of the internal combustion engine 1, in particular as a function of the counter in the cell of the group of maps $MAPS_2$ which corresponds to that given cylinder 2 and that given engine point.

In one embodiment, because the corresponding counter in the cell of the group of maps $MAPS_2$ which corresponds to a given cylinder 2 and to a given engine point is decreased by one unit for a given cylinder 2 and a given engine point when a combustion is observed during the life of the internal combustion engine 1, the condition may be reached in which the counter is zero and so the filtered value of the combustion energy $\mu_i$ of the i-th combustion taken into account is no longer taken into consideration; in other words, the mean combustion energy $\mu_i$ of the i-th combustion taken into account for the cylinder 2 taken into account in the current engine point is equal to the value already stored in the cell in the group of maps $MAPS_1$.

In another embodiment, the corresponding counter in the cell of the group of maps $MAPS_2$ which corresponds to that given cylinder 2 and to that given engine point is decreased by one unit until the corresponding lower saturation value is reached when a combustion is observed during the life of the internal combustion engine 1 for a given cylinder 2 and in a given engine point. Once the counter has reached the corresponding lower saturation value it is no longer decreased but maintained constant at the lower saturation value. Thereby, it is not possible to reach the condition in which the filtered value of the combustion energy $\mu_i$ of the i-th combustion taken into account is not considered. And thereby, the mean combustion $\mu_i$ of the i-th combustion taken into account for the cylinder 2 taken into account in the current engine point will continue to be equal to the weighted mean between the value already stored in the cell in the group of maps $MAPS_1$ and the filtered value of the combustion energy $\mu_i$ of the i-th combustion taken into account; wherein the value already stored in the cell in the group of maps $MAPS_1$ will have a predominant weight and the filtered value of the combustion energy $\mu_i$ of the i-th combustion taken into account will have a reduced weight.

Block 40 thus outputs the mean combustion energy $\mu_{i\_m}$ for the cylinder 2 taken into account in the current engine point, which is transmitted and inputted to a block 50. Block 50 thus receives in input both the mean combustion energy $\mu_{i\_m}$ for the cylinder 2 taken into account in the current engine point block 40 and the combustion energy $\mu_i$ of the i-th combustion taken into account for the cylinder 2 taken into account in the current engine point by block 30. Block 50 is further suited to compare the mean combustion energy value $\mu_{i\_m}$ for the cylinder 2 taken into account in the current engine point with the combustion energy $\mu_i$ of the i-th combustion taken into account for the cylinder 2 taken into account in the current engine point. Thereby, block 50 can establish by how much the combustion energy $\mu_i$ of the i-th combustion taken into account for the cylinder 2 taken into account in the current engine point differs from the mean combustion energy $\mu_{i\_m}$ for the cylinder 2 taken into account in the current engine point. Block 50 thus determines the deviation of the i-th combustion taken into account for the cylinder 2 taken into account in the current engine point, which represents the cyclic variability (the tendency or predisposition to detonate of the i-th combustion taken into account for the cylinder 2 taken into account in the current engine point). Block 50 thus outputs the deviation of the i-th combustion taken into account for the cylinder 2 taken into account in the current engine point which is transmitted and inputted into a block 60. Block 60 receives in input both the deviation of the i-th combustion taken into account for the cylinder 2 taken into account in the current engine point from block 50 and the maximum tolerable deviation for the cylinder 2 taken into account in the current engine point. Furthermore, block 60 is suited to compare the deviation of the i-th combustion taken into account for the cylinder 2 taken into account in the current engine point with the maximum deviation for the cylinder 2 taken into account in the current engine point.

The method for determining the maximum standard deviation $\sigma_{i\_MAX}$ for each cylinder 2 for each engine point explored during the operation of the internal combustion engine 1 is described below. The control unit 16 is suited to implement an "intrusive" strategy for controlling the spark advance according to which the standard spark provided by the engine control by the maps 17 for each cylinder 2 in each engine point is degraded to be placed into the conditions in which the generation of detonation phenomena will not occur. Typically, such an "intrusive" strategy thus includes reducing the actuated spark advance until it is placed in the conditions in which certainly no detonation phenomena will occur for each cylinder 2 in each engine point. A group of maps $MAPS_3$ are stored in the control unit 16. In one embodiment, the group of maps $MAPS_3$ includes a map $MAPS_3$ for each cylinder 2 of the internal combustion engine 1. In turn, each map $MAPS_3$ for each cylinder 2 of the internal combustion engine 1 includes a variable number of cells as a function of the engine points which may be explored during running of the internal combustion engine 1. Each map MAPS3 for each cylinder 2 of the internal combustion engine 1 includes a number of cells univocally identified by the number of revolutions per minute (rpm) and the load). A group of maps $MAPS_4$ are also stored in the control unit 16. In one embodiment, the structure of the group of maps $MAPS_4$ is identical to the structure of the group of maps $MAPS_3$. Thus the group of maps $MAPS_4$ may include a map $MAPS_4$ for each cylinder 2 of the internal combustion engine 1 (a respective map $MAPS_3$ of the group of maps $MAPS_3$ is associated to each map $MAPS_4$). Furthermore, in turn, each map $MAPS_4$ for each cylinder 2 of the internal combustion engine 1 includes a variable number of cells as a function of the engine points which may be explored during running of the internal combustion engine 1. Each map $MAPS_4$ for each cylinder 2 of the internal combustion engine 1 includes a number of cells univocally identified by the number of revolutions per minute (rpm) and the load (load). Also in this case, each cell which identifies an engine point in the maps $MAPS_4$ corresponds to a respective cell which identifies the same engine point in the $MAPS_3$. The group of maps $MAPS_4$ includes, in the cells, counters of the number of combustions taken into account during the life of the internal combustion engine 1 for the corresponding cylinder 2 and in a given engine point.

The counters in the cells of the group of maps $MAPS_4$ are initialized in a preliminary adjustment and set up phase of the control unit 16. In one embodiment, the initialization values of the counters in the cells of the group of maps $MAPS_4$ are variable as a function of the cylinder 2 and/or the engine point taken into account. In use, when a combustion is observed during the life of the internal combustion engine 1 for a given cylinder 2 and in a given engine point, the corresponding counter in the cell in the group of maps $MAPS_4$ which corresponds to that given cylinder 2 and that given engine point is decreased by one unit. Because the control unit 16 is suited to actuate a spark advance for each cylinder 2 in each engine point in order to avoid the generation of detonation phenomena, a number of combustions can be observed for the cylinder 2 taken into account in the current engine point equal to the corresponding counter in the cell of the group of maps $MAPS_4$ which corresponds to that given cylinder 2 and that given engine point in which detonation phenomena will certainly not occur. For each i-th combustion taken into account for the cylinder 2 taken into account in the current engine point it is possible to analyze the signal of the i-th combustion itself taken into account and, in particular, it is possible to learn the nominal value of the noise peak of the i-th combustion taken into account for the cylinder 2 taken into account in the current engine point (with respect to the previous ones, from the starting instant of the learning procedure) to determine the maximum standard deviation $\sigma_{i\_MAX}$ for the cylinder 2 taken into account in the current engine point.

The nominal value of the noise peak of the i-th combustion taken into account for the cylinder 2 taken into account in the current engine point is used to update the corresponding cell in the group of maps $MAPS_3$ (the nominal value of the noise peak of the i-th combustion taken into account for the cylinder 2 taken into account in the current engine point is used to update the map $MAPS_3$ of the cylinder 2 taken into account in the current engine point defined by the number of revolutions per minute (rpm) and by the load (load)). The updating of the cell in the group of maps MAPS3 is obtained by a weighted mean between the value already stored in the said cell in the group of maps $MAPS_3$ and the nominal value of the noise peak value of the i-th combustion taken into account for the cylinder 2 taken into account in the current engine point. The weighted mean between the value already stored in the cell in the group of maps $MAPS_3$ and the nominal value of the noise peak of the i-th combustion taken into account for the cylinder 2 taken into account in the current engine point (with respect to the previous ones, from the starting instant of the learning procedure) is made so that the nominal value of the noise peak of the i-th combustion taken into account for the cylinder 2 taken into account in the current engine point has a gradually increasing weight. In other words, the more i-th combustions of the cylinder 2 taken into account in the current engine point in which the combustion energy $\mu_i$ (its nominal noise) can be observed, the more relevant will be the contribution of the nominal value of the noise peak of the i-th combustion taken into account for the cylinder 2 taken into account in the current engine point and the more relevant will be the contribution of the value already stored in the respective cell of the group of maps $MAPS_3$.

As the number of combustions observed during the life internal combustion engine 1 for given cylinder 2 and given engine point (as the counter in the cell of the group of maps $MAPS_4$ which corresponds to that given cylinder 2 and that given engine point) decreases, the weight of the nominal value of the noise peak of the i-th combustion taken into account for the cylinder 2 taken into account in the current engine point increases. In the weighted mean of the value already stored in the cell in the group of maps $MAPS_3$ and the nominal value of the noise peak of the i-th combustion taken into account for the cylinder 2 in the current engine point, the values of the weights are thus variable during the step of learning of the internal combustion engine 1, in particular as a function of the counter in the cell of the group of maps $MAPS_4$ which corresponds to that given cylinder 2 and that given engine point.

In one embodiment, since the corresponding counter in the cell of the group of maps $MAPS_4$ which corresponds to a given cylinder 2 and to a given engine point is decreased by one unit when a combustion is observed during the life of the internal combustion engine 1 for that given cylinder 2 and that given engine point, the condition is reached in which the counter is zero and the learning phase may be said to be concluded. However, since reducing the spark advance in a cylinder 2 corresponds to a loss of thermodynamic efficiency in terms of combustion efficiency as the air mass for cylinder 2, and thus the injected gasoline mass as well, are maintained constant, but the fraction of chemical energy converted into mechanical energy is reduced and because the learning phase for each cylinder is rather long, the learning step may be carried out on one cylinder at a time to avoid negative repercussions on fuel consumption and on the generation of polluting substances.

Block 60 thus receives in input both the standard deviation $\sigma_i$ of the i-th combustion taken into account for the cylinder 2 taken into account in the current engine point from block 50 and the maximum standard deviation $\sigma_{i\_MAX}$ for the cylinder 2 taken into account in the current engine point. Furthermore, block 60 is provided to compare the standard deviation $\sigma_i$ of the i-th combustion taken into account for the cylinder 2 taken into account in the current engine point with the maximum standard deviation $\sigma_{i\_MAX}$ for the cylinder 2 taken into account in the current engine point. Furthermore, block 60 is suited to determine the development of detonation phenomena as a function of the comparison of the standard deviation $\sigma_i$ of the i-th combustion taken into account for the cylinder 2 taken into account in the current engine point (which also represents the tendency to detonate of the i-th combustion taken into account for the cylinder 2 taken into account in the current engine point) with the maximum standard deviation $\sigma_{i\_MAX}$ for the cylinder 2 taken into account in the current engine point.

In the description above, the size of the maps indicated by $MAPS_1$, $MAPS_2$, $MAPS_3$ and $MAPS_4$ respectively depend on the number of cylinders (ncyl) and from the engine point (on the number of revolutions per minute (rpm) and the load (load)).

In one embodiment, the control unit 16 is suited to re-initialize the groups of maps indicated by $MAPS_1$, $MAPS_2$, $MAPS_3$ and $MAPS_4$ respectively at the ignition events of the control unit 16. The countersin the cells of the group of maps $MAP_2$ and of the group of maps $MAPS_4$ may be initialized in a preliminary adjustment and set up phase of the control unit 16 to zero values. Furthermore, the upper saturation values are determined in a preliminary adjustment and set up phase. Moreover, the upper saturation values may be variable as a function of the cylinder 2 and/or the engine point taken into account. In use, the corresponding counter in the respective cell of a group of maps $MAPS_2$ and in the respective cell of the group of maps $MAPS_4$ which corresponds to a given cylinder 2 and that a engine point is increased by one unit until the upper saturation value is reached when a combustion is observed during the life of the internal combustion engine 1 for that given cylinder 2 and in that given engine point.

In this way, the above-described control method is applied individually to each cylinder 2, so that the inevitable differences which exist between the various cylinders due to the effect of construction tolerances and of the temperature differences of the walls of the cylinders due to the different positions of cylinders 2 in the internal combustion engine 1 may be taken into consideration. Moreover, the above-described control method is simple and cost-effective to implement in an electronic control unit of an internal combustion engine 1 because it does not require any physical modifications and employs a low calculation capacity of the control unit 6. Furthermore, the above-described detonation control method allows to recognize the development of detonation phenomena effectively and keep the detonation in the various cylinders 2 under control without noticeable negative effects on combustion thermodynamic efficiency, that is maintained close to the maximum possible values with evident benefits on consumptions and pollution containment.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A method for detecting the development of detonation phenomena in an internal combustion engine (1) provided with a number of cylinders (2), a control unit (16), and a number of detonation sensors connected to the control unit (16); wherein, detonation sensors include at least one of an accelerometer and a voltage gauge which is connected and arranged in series to the electric circuit of a spark plug (15) to measure the voltage at the terminals of the electrodes of the spark plug (15) during combustion and/or a pressure gauge which measures the maximum amplitude pressure oscillation (MAPO) of the intensity of the pressure waves generated in the cylinders (2) during combustion; the method comprises the steps of:

acquiring the signal (S) coming from said number of detonation sensors connected to the control unit (16);

processing the signal (S) coming from said number of detonation sensors connected to the control unit (16) so as to obtain the detonation energy ($\mu_i$) of each combustion taken into account for a given cylinder (2) and in a given engine point;

filtering the detonation energy ($\mu_i$) of each combustion taken into account for a given cylinder (2) and in a given engine point;

calculating the mean detonation energy ($\mu_{i\_m}$) for a given cylinder (2) and in a given engine point with the filtered value of the detonation energy ($\mu_i$) of each combustion taken into account for a given cylinder (2) and in a given engine point;

comparing the detonation energy ($\mu_i$) of each combustion taken into account for a given cylinder (2) and in a given engine point with the mean detonation energy ($\mu_{i\_m}$) for a given cylinder (2) and in a given engine point;

determining the variance ($\sigma_i$) of each combustion taken into account for a given cylinder (2) and in a given engine point as a function of the comparison between the detonation energy ($\mu_i$) of each combustion taken into account for a given cylinder (2) and in a given engine point and the mean detonation energy ($\mu_{i\_m}$) for a given cylinder (2) and in a given engine point;

calculating the maximum variance ($\sigma_{i\_max}$) for a given cylinder (2) and in a given engine point with a reduction of the spark advance actuated in the given cylinder (2);

comparing the maximum variance ($\sigma_{i\_max}$) for a given cylinder (2) and in a given engine point with the variance ($\sigma_i$) of each combustion taken into account for a given cylinder (2) and in a given engine point; and determining the development of detonation phenomena for each combustion taken into account for a given cylinder (2) and in a given engine point as a function of the comparison between the maximum variance ($\sigma_{i\_max}$) for a given cylinder (2) and in a given engine point and the variance ($\sigma_i$) of each combustion taken into account for a given cylinder (2) and in a given engine point.

2. The method as set forth in claim 1, wherein the step of calculating the maximum variance ($\sigma_{i\_max}$) for a given cylinder (2) and in a given engine point with a reduction of the spark advance actuated in the given cylinder (2) is performed by degrading the spark advance actuated in the given cylinder (2) up to a value that is such that no detonation phenomena will occur.

3. An electronic control unit (16), which is suited to implement a method for detecting the development of detonation phenomena in an internal combustion engine (1) performed as set forth in claim 1.

4. The method as set forth in to claim 1, including the further steps of:

initializing, in a preliminary adjustment and set up phase, a first map ($MAPS_1$) with the values of the mean detonation energy ($\mu_{i\_m}$) for a given cylinder (2) and in a given engine point; and updating the first map ($MAPS_1$) with the filtered value of the detonation energy ($\mu_i$) of each combustion taken into account for a given cylinder (2) and in a given engine point.

5. The method as set forth in claim 4, wherein at least one of the first map ($MAPS_1$), the second map ($MAPS_2$), the third map ($MAPS_3$), and the fourth map ($MAPS_4$) have a number of cells that varies as a function of the number ($N_{cyl}$) of cylinders (2) and of the engine points identified by the number of revolutions per minute (rpm) and by the load (load).

6. The method as set forth in claim 4, further including the further step of updating the first map ($MAPS_1$) with the filtered value of the detonation energy ($\mu_i$) of each combustion taken into account for a given cylinder (2) and in a given engine point with a weighted mean between the filtered value of the detonation energy ($\mu_i$) of each combustion taken into account for a given cylinder (2) and in a given engine point and the value of the mean detonation energy ($\mu_{i\_m}$) for a given cylinder (2) and in a given engine point contained in the first map ($MAPS_1$).

7. The method as set forth in claim 6, including the further steps of:
  initializing, in a preliminary adjustment and set up phase, a second map ($MAPS_2$) of counters of the combustions taken into account for a given cylinder (2) and in a given engine point; and
  determining the weights to be assigned to the filtered value of the detonation energy ($\mu_i$) of each combustion taken into account for a given cylinder (2) and in a given engine point and to the value of the mean detonation energy ($\mu_{i\_m}$) for a given cylinder (2) and in a given engine point contained in the first map ($MAPS_1$) as a function of the second map ($MAPS_2$) of counters of the combustions taken into account for a given cylinder (2) and in a given engine point.

8. The method as set forth in claim 7, wherein the filtered value of the detonation energy ($\mu_i$) of each combustion taken into account for a given cylinder (2) has a gradually decreasing value.

9. The method as set forth in claim 1, including the further steps of:
  initializing, in a preliminary adjustment and set up phase, a third map ($MAPS_3$) with the values of the maximum variance ($\sigma_{i\_max}$) for a given cylinder (2) and in a given engine point; and
  updating, during a learning phase, the third map ($MAPS_3$) with the nominal value of the noise peak of the i-th combustion taken into account for a given cylinder (2) and in a given engine point.

10. The method as set forth in claim 9, including the further step of updating the third map ($MAPS_3$) with the nominal value of the noise peak of the i-th combustion taken into account for a given cylinder (2) and in a given engine point with a weighted mean between the nominal value of the noise peak of the i-th combustion taken into account for a given cylinder (2) and in a given engine point and the value of the maximum variance ($\sigma_{i\_max}$) for a given cylinder (2) and in a given engine point contained in the third map ($MAPS_3$).

11. The method as set forth in claim 10, including the further steps of:
  initializing, in a preliminary adjustment and set up phase, a fourth map ($MAPS_4$) of counters of the combustions taken into account for a given cylinder (2) and in a given engine point; and
  determining the weights to be assigned to the nominal value of the noise peak of the i-th combustion taken into account for a given cylinder (2) and in a given engine point and to the value of the maximum variance ($\sigma_{i\_max}$) for a given cylinder (2) and in a given engine point contained in the third map ($MAPS_3$) as a function of the fourth map ($MAPS_4$) of counters of the combustions taken into account for a given cylinder (2) and in a given engine point.

12. The method as set forth in claim 11, wherein the nominal value of the noise peak of the i-th combustion taken into account for a given cylinder (2) and in a given engine point has a gradually increasing value.

\* \* \* \* \*